(No Model.) 2 Sheets—Sheet 1.
J. LORD & T. R. LEASON.
CHECK AND INDICATOR FOR RAILWAYS.
No. 523,859. Patented July 31, 1894.
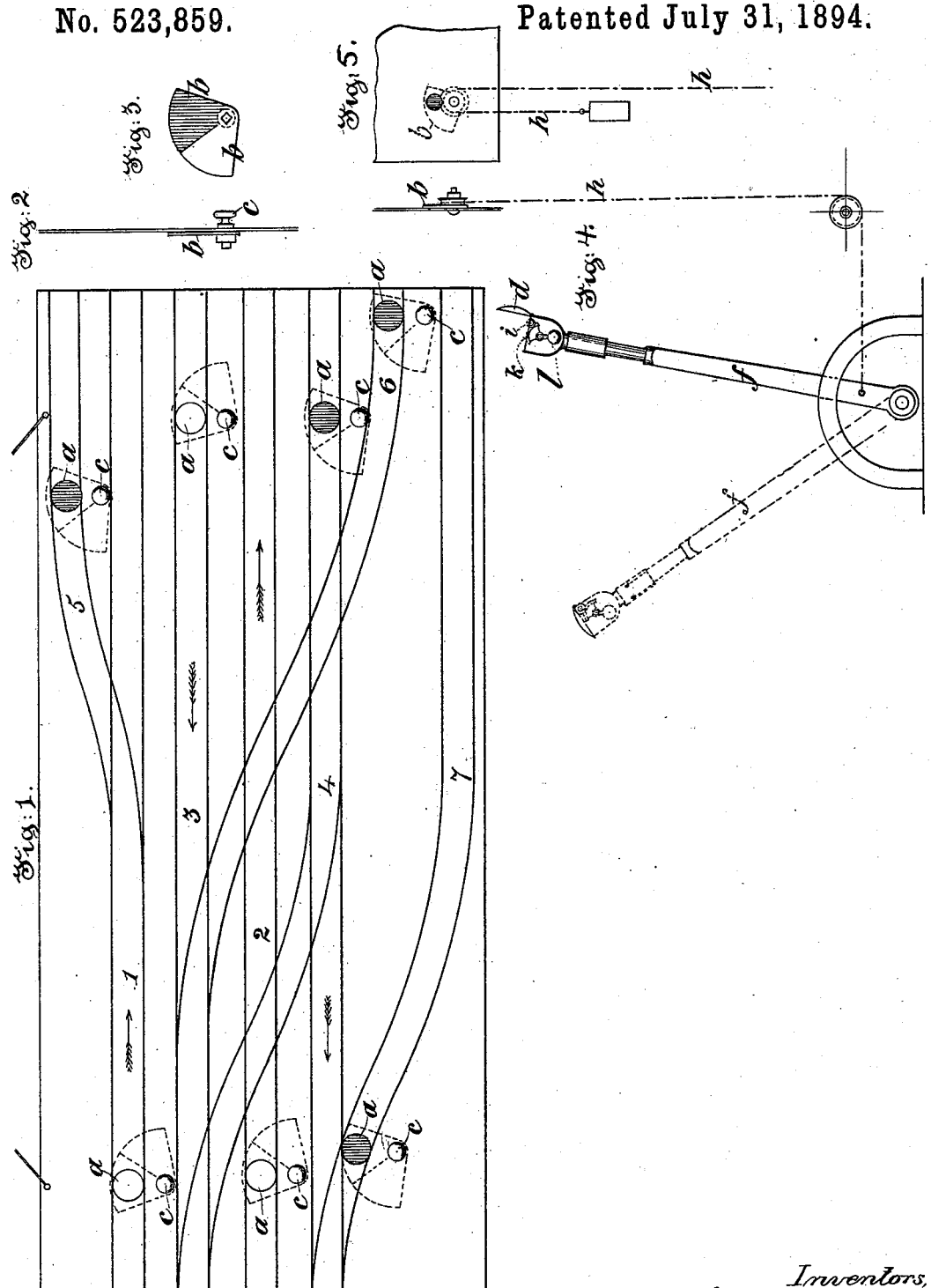
Witnesses:
George Baumann
J. C. Connor
Inventors,
John Lord and
Thomas R. Leason
By their Attorneys
Howson and Howson (No Model.) 2 Sheets—Sheet 2.
J. LORD & T. R. LEASON.
CHECK AND INDICATOR FOR RAILWAYS.
No. 523,859. Patented July 31, 1894.
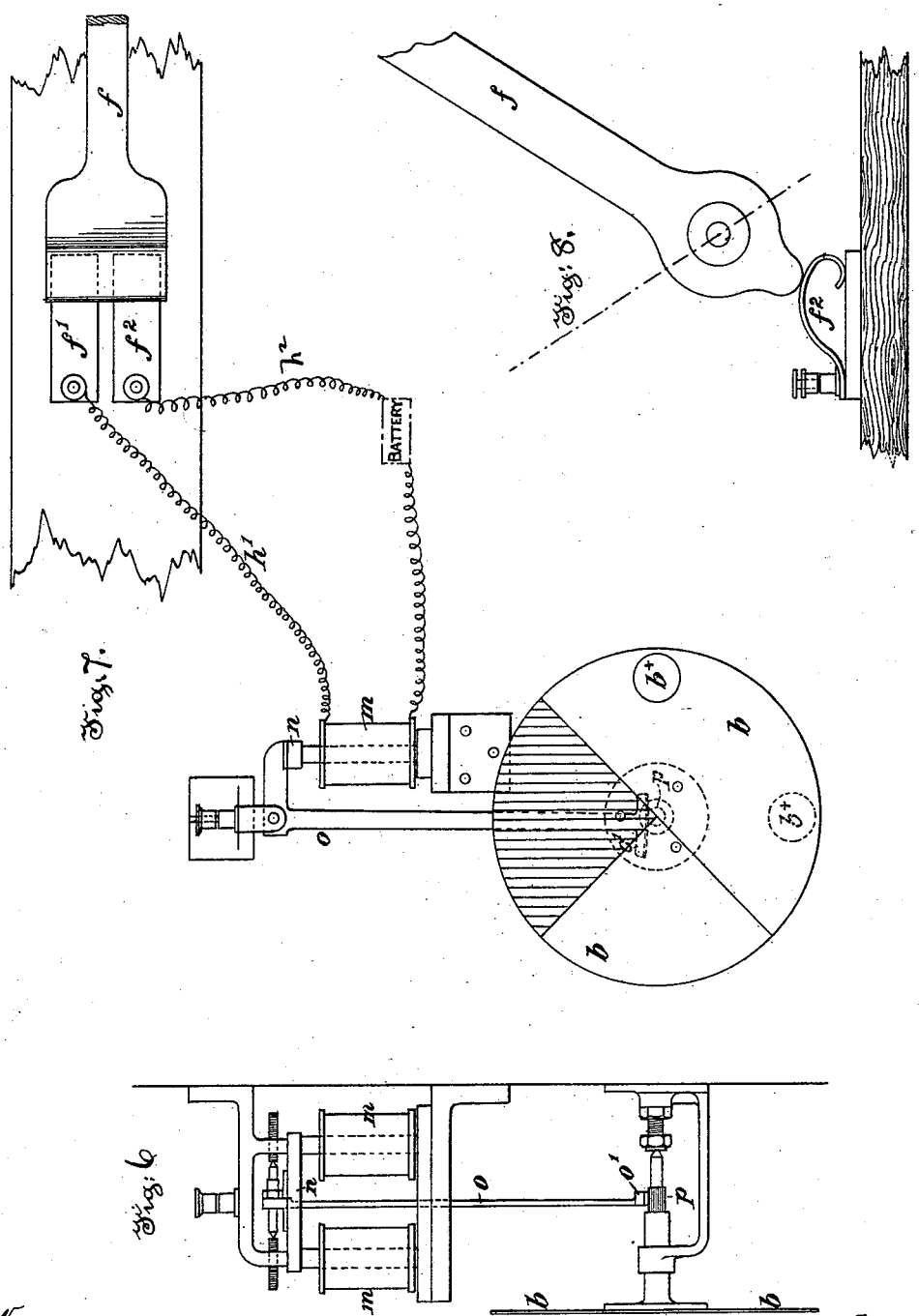

UNITED STATES PATENT OFFICE.

JOHN LORD, OF WILMSLOW, AND THOMAS R. LEASON, OF LEVENSHULME, ASSIGNORS TO SAMUEL CHATWOOD, OF WORSLEY, ENGLAND.

CHECK AND INDICATOR FOR RAILWAYS.

SPECIFICATION forming part of Letters Patent No. 523,859, dated July 31, 1894.

Application filed August 8, 1893. Serial No. 482,647. (No model.) Patented in England July 22, 1891, No. 12,422.

*To all whom it may concern:*

Be it known that we, JOHN LORD, residing at Wilmslow, in the county of Chester, and THOMAS ROBERT LEASON, residing at Levenshulme, Manchester, county of Lancaster, England, subjects of the Queen of Great Britain and Ireland, have invented an Improved Pointsman's Indicator for Railways, (for which we have received patent in Great Britain, No. 12,422, dated July 22, 1891,) of which the following is a specification.

The object of this invention is to prevent the occurrence of accidents and consequent loss of human life upon railways, more especially such accidents as are caused by the pointsman inadvertently turning an engine, carriage or train onto a siding which has been blocked or onto which he has temporarily shunted another engine, carriage or train, or which is otherwise occupied.

The nature of our said invention and the manner in which the same is to be performed or carried into practical effect will be readily understood on reference to the annexed sheets of drawings and the following explanation thereof.

Figure 1 is a front elevation of one of our charts hereinafter described. Fig. 2 is a section of a part thereof. Fig. 3 is a view of the shutter detached. Figs. 4 and 5 show the pointsman's lever, and a method of actuating the shutter $b$ thereby. Figs. 6 and 7 show another method of actuating the said shutter, and Fig. 8 is a detached view of the lever and electric contact maker used in the last arrangement.

For the purpose of our invention we provide the pointsman with a chart or indicator representing the points and lines under his charge upon which he can see at a glance the exact state (whether "blocked" or clear) of each line, siding or bay, so that the strain upon his mind of having to trust principally to his memory is greatly relieved, and with ordinary care he is not likely to fall into error.

The indicator consists of a chart or plan (see Fig. 1 on the drawings) representing all the lines, crossings, sidings and bays under the charge of the pointsman which are numbered or lettered to correspond with his levers Nos. 1 and 2 being main up lines, Nos. 3 and 4 being main down lines and Nos. 5, 6 and 7 sidings or bays.

Each line, siding or bay has an opening $a$ of suitable size and form (shown circular on the drawings) at the back of which is a disk or shutter $b$ (see edge view Fig. 2 and face view Fig. 3) made of metal or other suitable material partly white and partly red (as shown by vertical lines) which can be moved by a thumb piece or button $c$ in front of the indicator so as to show a white or a red disk, numbers 1, 2, 3 being shown at Fig. 1 as "clear," and numbers 4, 5, 6, and 7 "blocked."

We prefer that the indicator should be hung on the wall just above the handles or otherwise so as to be well in sight of the pointsman, and it will be his duty whenever he turns an engine, train or carriage onto a particular line, siding or bay to "block" the same by turning the corresponding red disk on his indicator by means of the button $c$ and to let it remain there until the "block" has been removed when he will turn on the white disk again so that at any moment he can see at a single glance which lines, sidings or bays are occupied, or otherwise "blocked" and which are open or "clear."

It will be evident that the indicator may be worked by hand independently, or if thought preferable, it may be connected with the lever and made to work automatically, as shown in Figs. 4 and 5.

Referring to Figs. 4 and 5, it will be seen that the disk or shutter $b$ is connected by a weighted chain $h$ passing over pulleys to the lever $f$ so that the movement of the lever sets the disk or shutter $b$ to correspond automatically.

The disk or shutter $b$ may be actuated by electricity by the motion of the lever $f$ as shown for example by Figs. 6, 7 and 8. The said lever $f$ is prolonged to come against two springs $f'\ f^2$ each of which is connected to a wire $h'$ and $h^2$ forming part of an electric circuit in connection with the electro magnet $m$ so that when the lever is moved into the position shown the circuit is complete and the magnet will attract the armature $n$ attached to the rocking lever $o$ the other end of which is provided with a quadrant $o'$ or rack gearing into a pinion $p$ upon the spindle or pin of the disks or shutter $b$. The rack or quadrant $o'$ thus actuates the shutter $b$ moving it into the position shown to exhibit the blocked indication but as soon as the lever $f$ is replaced the weight $b^{\times}$ on the disk $b$ causes the latter to fall back to the "clear" position as seen by the dotted circle on Fig. 9.

We claim as our invention—

1. A pointsman's chart or indicator representing the points and lines under his charge, each line, siding or bay being provided with an aperture, in combination with a disk or shutter pivoted to swing in a plane parallel to the chart behind said aperture, the said disk being adapted to be moved or set so that the pointsman can always see at a glance the exact state (whether blocked or otherwise) of every part of the line under his charge, substantially as set forth.

2. The combination with a series of pointsman's levers and a chart representing the points and lines under his charge, each line, siding or bay on the chart being provided with an indicating disk or shutter, and connections between each such shutter and the lever controlling the corresponding line, siding or bay whereby the shutter is automatically moved with the movement of the lever, substantially as and for the purpose set forth.

In testimony whereof we have signed our names to this specification in the presence of two subscribing witnesses.

JOHN LORD.
THOS. R. LEASON.

Witnesses:
CHARLES A. DAVIES,
JNO. HUGHES.